United States Patent [19]

Monroe

[11] 3,982,156
[45] Sept. 21, 1976

[54] TOP-BOTTOM PIN-CUSHION CORRECTION CIRCUIT

[75] Inventor: Tex K. Monroe, Batavia, N.Y.

[73] Assignee: GTE Sylvania Incorporated, Stamford, Conn.

[22] Filed: Oct. 14, 1975

[21] Appl. No.: 622,134

[52] U.S. Cl.................................. 315/400; 315/371
[51] Int. Cl.²..................... H01J 29/70; H01J 29/76
[58] Field of Search..................... 315/370, 371, 400

[56] References Cited
UNITED STATES PATENTS

| | | | |
|---|---|---|---|
| 3,408,535 | 10/1968 | Lemke................................ | 315/400 |
| 3,825,793 | 7/1974 | Dietz.................................. | 315/400 |

Primary Examiner—Maynard R. Wilbur
Assistant Examiner—T. M. Blum
Attorney, Agent, or Firm—Norman J. O'Malley; Thomas H. Buffton; Robert T. Orner

[57] ABSTRACT

In a cathode ray tube scanning system having a deflection yoke with horizontal and vertical deflection windings coupled to deflection current sources having horizontal and vertical scan rates, a top-bottom pin-cushion correction circuit includes a saturable reactor having a control winding coupled by a unidirectional conduction device to a flyback pulse signal source with a resonating capacitor coupling the unidirectional conduction device and control winding to a potential reference level and an output winding coupled to the current source at the vertical scan rate and shunted by a tuning means including a capacitor.

9 Claims, 1 Drawing Figure

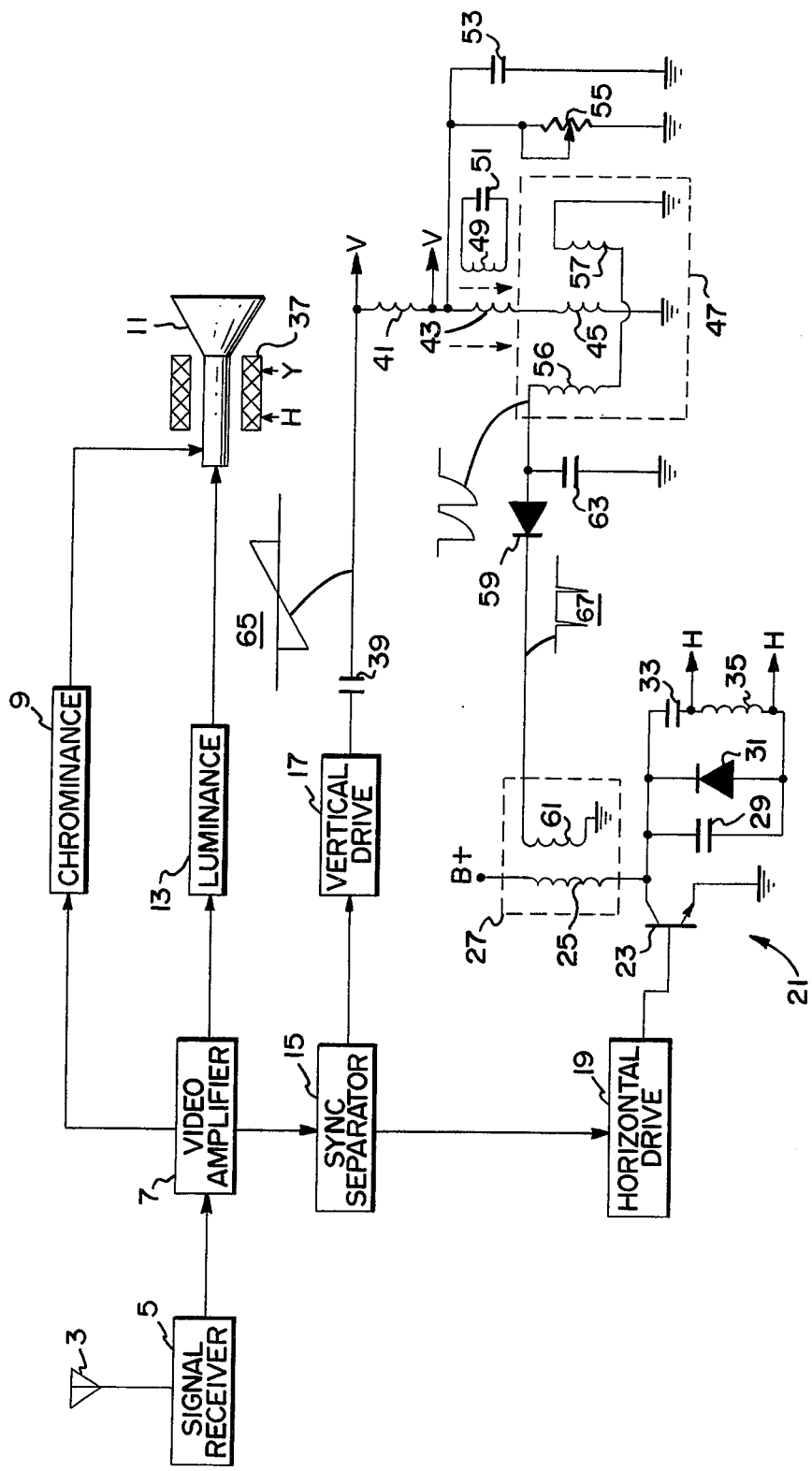

TOP-BOTTOM PIN-CUSHION CORRECTION CIRCUIT

BACKGROUND OF THE INVENTION

This invention relates to cathode ray tube scanning systems and more particularly to apparatus for correcting scanning raster distortions known as top-bottom pin-cushion distortions.

As is well known in the cathode ray tube scanning art, the display raster of a cathode ray tube is composed of successive spaced horizontal scan lines to form a substantially rectangular raster. Although the raster is desirably rectangular under normal operating conditions, it is also well known that the raster is frequently distorted at the top and bottom in what is known as top-bottom pin-cushion distortion.

As is also well known, top-bottom pin-cushion distortion is indicated by a departure of the horizontal scanning lines from a straight line. Specifically, the horizontal scan lines at the top half of the raster tend to bow downwardly toward the center of the raster while the horizontal scan lines at the bottom half of the raster tend to bow upwardly toward the center of the raster.

One known form of apparatus for correcting undesired top-bottom pin-cushion distortion utilizes a one-quarter inch E core saturable reactor wherein the control winding of the pin-cushion correction transformer is in series connection with the horizontal deflection winding of the yoke. Thus, the relatively high horizontal yoke current is routed through the pin-cushion transformer winding which may have an adverse effect upon such features as linearity and S-curve correction. Moreover, it has been found that such apparatus may be satisfactory for cathode ray tubes having a deflection angle up to about 90° but tends to result in center compression and inadequate pin-cushion correction when cathode ray tubes with 110° deflection angles are employed.

In another known form of apparatus for correcting top-bottom pin-cushion distortion, a one-quarter inch E-core saturable reactor is utilized wherein a control winding is coupled to a separate winding on the flyback transformer. However, when the flyback pulse signal ends or returns to zero the control winding of the pin-cushion apparatus is, for all practical purposes, short-circuited. Thus, there is no ringing signal for transfer to the secondary winding of the pin-cushion correction apparatus.

OBJECTS AND SUMMARY OF THE INVENTION

An object of the present invention is to provide an enhanced cathode ray tube scanning system. Another object of the invention is to provide apparatus for improving top-bottom pin-cushion correction in a cathode ray tube scanning system. Still another object of the invention is to provide top-bottom pin-cushion correction apparatus having improved efficiency. A further object of the invention is to provide top-bottom pin-cushion apparatus of increased efficiency with a capability for use in 110° deflection systems and having a saturable reactor of a size previously utilized in 90° deflection systems.

These and other advantages and capabilities are achieved in one aspect of the invention by top-bottom pin-cushion correction apparatus having a saturable reactor with a control winding shunted by a resonance capacitor and coupled by a unidirectional conduction device to a source of flyback pulse signals at the horizontal scan rate and an output winding coupled to a vertical deflection current source and shunted by a tuning means including a capacitor.

BRIEF DESCRIPTION OF THE DRAWINGS

The sole FIGURE is a block and schematic illustration of a television receiver utilizing a preferred form of top-bottom pin-cushion correction apparatus of the invention.

PREFERRED EMBODIMENT OF THE INVENTION

For a better understanding of the present invention, together with other and further objects, advantages and capabilities thereof, reference is made to the following disclosure and claims in conjunction with the accompanying drawing.

Referring to the drawing, a color television receiver includes an antenna 3 for intercepting and applying transmitted color television signals to a signal receiver 5. The signal receiver 5 includes the usual radio frequency (RF), intermediate (IF) frequency, and video amplifier detector stages to provide a composite color video signal.

The composite color video signal from the signal receiver 5 is applied to a video amplifier 7. The video amplifier 7 provides an output signal which is applied to a chrominance channel 9 wherefrom are derived signals representative of color information in the transmitted signal. These color information signals from the chrominance channel 9 are applied to a color cathode ray tube 11 to effect the desired display of color information.

Another output from the video amplifier 7 is applied to a luminance channel 13 wherein signals representative of image information are derived and applied to the color cathode ray tube 11. Still another output from the video amplifier 7 is applied to a sync pulse separator stage 15 wherein synchronizing signals at the vertical scan rate are separated from the video signal and applied to vertical drive circuitry 17 while synchronizing signals at the horizontal scan rate are separated from the video signal and applied to horizontal drive circuitry 19.

The horizontal drive circuitry 19 is coupled to a horizontal output circuit 21 which includes a transistor 23 connected to circuit ground and by way of a winding 25 of a horizontal flyback transformer 27 to a potential source B+. A capacitor 29 and damper diode 31 shunt the transistor 23 while a series connected S-curve correction capacitor 33 and horizontal deflection yoke winding 35 are connected in parallel with the damper diode 31. The horizontal deflection yoke winding 35 is a part of a deflection yoke 37 associated with the cathode ray tube 11 in a manner well known in the art.

An output from the vertical drive circuitry 17 is AC coupled by a capacitor 39 to a vertical deflection yoke winding 41 which is also a part of the deflection yoke 37 associated with the cathode ray tube 11. The vertical deflection winding 41 is coupled by a phase coil winding 43 to an output winding 45 of a saturable reactor 47. The output winding 45 is connected to circuit ground.

The phase coil winding 43 has an associated parallel resonant phasing circuit including a winding 49 and capacitor 51. Also, the series connected phase coil winding 43 and output winding 45 of the saturable reactor 47 are shunted by a capacitor 53 to provide a resonant circuit. The capacitor 53 is shunted by an adustable impedance in the form of a variable resistor 55 whereby the Q of the resonant circuit may be varied.

Further, the saturable reactor 47 includes a pair of similar control windings, 56 and 57 respectively, which are affixed to a pair of legs (not shown) of the saturable reactor 47. The control winding 56 and 57 are series connected in magnetically opposing manner to circuit ground and to a diode 59 coupled to a winding 61 on the horizontal flyback transformer 27. A resonating capacitor 63 connects the junction of the control winding 56 and diode 59 to circuit ground.

As to operation, the vertical drive circuitry 17 provides a substantially sawtooth-shaped drive current 65. This drive current 65 is applied to the series connected vertical deflection yoke winding 41, phase coil winding 43, and output winding 45 of the saturable reactor 47.

The horizontal drive circuitry 19 provides an output signal which activates the horizontal output circuit 21 at the horizontal scan rate of about 15,750 Hz. The horizontal output circuit 21 provides a substantially sawtooth-shaped current which is modified by the S-curve correction capacitor 33 and flows through the horizontal deflection winding 35 of the deflection yoke 37. Moreover, the sawtooth-shaped current is damped by the damper diode 31 to inhibit oscillations in a manner well known in the art.

Also, a flyback pulse signal 67 at the horizontal scan rate of 15,750 Hz is present at the winding 61 of the horizontal flyback transformer 27. This flyback pulse signal 67 is applied to and effects conductivity of a diode 67 to cause charging of the resonating capacitor 63. Upon completion of the pulse signal 67, the diode 67 is reverse biased by the charge on the resonating capacitor 63 whereupon the circuitry is, in essence, disconnected from the flyback transformer winding 61.

The resonating capacitor 63 now forms a resonant circuit with the control windings, 56 and 57 of the saturable reactor 47. The charge on the resonating capacitor 63 provides current flow, waveform 69, into the control windings 56 and 57. When the charge on the resonating capacitor 63 reverses and attempts to swing positive, the diode 59 is rendered conductive and effectively damps the oscillation to one-half cycle.

As is also well known, the direction and amplitude of the vertical drive current, waveform 65, through the output winding 45 of the saturable reactor 47 effects magnetic biasing of the core in a manner such that the core associated with either the control winding 56 or the control winding 57 is pushed further into saturation. Moreover, the control winding 56 and 57, which tends in the direction of less saturation is most efficient in coupling a signal to the output winding 45.

This signal coupled from one of the control windings 56 or 57 to the output winding 45 shock excites the resonant circuit which includes the series connected phase coil winding 43 and output winding 45 shunted by the capacitor 53. In turn, the resonant circuit rings in sinusoidal fashion. Moreover, the direction of the vertical drive current 65 through the output winding 45 determines the phase direction of the correction voltage. In other words, a zero vertical current through the output winding 45 at the center of the vertical scan effects cancellation of the output from the control windings 56 and 57 while reversal of the vertical current through the winding 45 causes phase reversal of the correction voltage having a horizontal frequency rate.

Additionally, the phase coil winding 43 and the parallel resonant phasing circuit including winding 49 and capacitor 51 are tuned to the second harmonic of the horizontal scan frequency of 15,750 Hz or to a frequency of 31.5 KC. Thus, a desired parabolic waveshape, as opposed to a sinusoidal waveshape, is more nearly approximated. Although wave-shaping provided by the above-mentioned circuitry is preferred for large size display devices, it has not been found necessary for some small size screens or display devices.

As an illustration of one preferred embodiment but in no way limiting the invention, the following component values were found appropriate:

| Saturable Reactor 47 | ¼ "E" core | Ferrite 24B |
| --- | --- | --- |
| winding 45 | 7½ turns | No. 22 wire |
| winding 56 | 175 turns | No. 30 wire |
| winding 57 | 175 turns | No. 30 wire |
| Phase coil | | |
| winding 43 | 64 uH | adjustable |
| winding 49 | 50 uH | adjustable |
| Capacitors | | |
| Cap. 51 | 0.47 mfd | 100$^r$ |
| Cap. 53 | 1.50 mfd | 100$^r$ |
| Cap. 63 | 0.0.5 mfd | 400$^r$ |
| Resistor 55 | 3000 ohm 2w adj. | |
| Diode 59 | General Electric A 119 E | |

Thus there has been provided a unique top-bottom pin-cushion correction circuitry for a cathode ray tube display system. The correction circuitry not only includes an isolating unidirectional conduction device for disconnecting a resonant circuit from the source but also provides a control circuit having a natural resonant frequency which is utilized to enhance the efficiency of the system.

This efficiency is enhanced by allowing the horizontal driving source for the control winding of the saturable reactor to be disconnected during most of the horizontal trace interval. Thus, the damping effect of the horizontal driving source on the saturable reactor is eliminated. Hence, energy stored in the control circuit capacitor during the horizontal retrace interval can be almost completely transferred to the saturable reactor during the horizontal trace interval since the control circuit capacitor dumps its energy into the control windings as these respective components swing through their resonant cycle.

As a result, much of this energy is then available for transfer by transformer action to the output resonant circuit. However, if the unidirectional coupling device is not employed, most of the energy transferred to the control circuit during the horizontal retrace interval is quickly dissipated back into the low impedance driving device rather than being available to excite the output winding and its associated resonant circuitry. As mentioned, the unidirectional conduction device enhances the linearity of the system while the horizontal deflection yoke winding is substantially isolated from the signal source for effecting the desired pin-cushion correction. Thus, an efficient, relatively inexpensive but highly reliable circuit has been provided.

While there has been shown and described what is at present considered the preferred embodiment of the invention, it will be obvious to those skilled in the art that various changes and modifications may be made therein without departing from the invention as defined by the appended claims.

What is claimed is:

1. In a cathode ray tube scanning system having a deflection yoke with horizontal and vertical deflection windings coupled to sources of deflection current at horizontal and vertical scan rates and said deflection yoke associated with a cathode ray tube, a top-bottom pin-cushion correction circuit comprising:
   a source of flyback pulse signals at the horizontal scan rate;
   a saturable reactor having a control winding and an output winding;
   means for coupling said control winding of said saturable reactor to said source of flyback pulse signals, said means including a unidirectional conduction device and a resonating capacitor for effecting a resonant circuit with said control winding;
   means for coupling said output winding of said saturable reactor to said source of deflection current at a vertical scan rate; and
   means for tuning said output winding of said saturable reactor to said horizontal scan rate; said means including a parallel connected capacitor and impedance shunting said output winding.

2. The top-bottom pin-cushion circuit of claim 1 wherein said unidirectional conduction device is rendered conductive upon application of a flyback pulse signal and non-conductive upon discontinuance of said flyback pulse signal.

3. The top-bottom pin-cushion correction circuit of claim 1 wherein said means for coupling said output winding to said source of deflection current at a vertical scan rate includes a series connected inductive winding and a circuit magnetically coupled thereto and resonant at the second harmonic of said horizontal scan rate for effecting phase correction of a raster appearing on said cathode ray tube.

4. The top-bottom pin-cushion correction circuit of claim 1 wherein said flyback pulse signal at the horizontal scan rate renders said unidirectional conduction device conductive and effects development of a charge on said resonating capacitor and discontinuance of said flyback pulse signal renders said unidirectional conduction device non-conductive with said charge on said resonating capacitor applied to said control windings of said saturable reactor.

5. The top-bottom pin-cushion correction circuit of claim 1 wherein said saturable reactor is in the form of an E-core configuration having a center leg with the output winding affixed thereto and a pair of outer legs and a pair of magnetically opposing serially connected control winding affixed thereto.

6. In a television receiver having a cathode ray tube with an associated deflection yoke having horizontal and vertical deflection windings coupled to sources of deflection currents a horizontal and vertical scan rates, a top-bottom pin-cushion correction circuit comprising:
   a saturable reactor having control windings and an output winding with said output winding coupled to said deflection currents at a vertical scan rate;
   a source of pulse signals at the horizontal scan rate;
   means coupling said pulse signals at the horizontal scan rate from said source to said control windings of said saturable reactor, said means including a diode coupling said source to said control windings and a resonating capacitor coupling said diode and control windings to a potential reference level; and
   means for tuning said output winding of said saturable reactor to said horizontal scan rate including a capacitor shunting said output winding.

7. The top-bottom pin-cushion correction circuit of claim 6 including means for effecting phase correction of a display appearing on said cathode ray tube, said means for effecting phase correction including a winding serially connecting said output winding of said saturable reactor to said source of deflection current at a vertical scan rate and a circuit magnetically coupled thereto and parallel resonant at the second harmonic of said horizontal scan rate.

8. The top-bottom pin-cushion correction circuit of claim 6 wherein said diode is rendered conductive and said resonating capacitor charged upon application of said pulse signal at the horizontal scan rate and said diode rendered non-conductive with said resonating capacitor discharging through said control winding upon discontinuance of said pulse signal.

9. The top-bottom pin-cushion correction circuit of claim 6 including an adjustable impedance shunting said capacitor of said means for tuning said output winding of said saturable reactor.

* * * * *

UNITED STATES PATENT AND TRADEMARK OFFICE
CERTIFICATE OF CORRECTION

PATENT NO. : 3,982,156
DATED : September 21, 1976
INVENTOR(S) : Tex K. Monroe

It is certified that error appears in the above-identified patent and that said Letters Patent are hereby corrected as shown below:

Col. 3, line 32 - Delete "67" and insert -- 59 --.

Col. 3, line 34 - Delete "67" and insert -- 59 --.

Signed and Sealed this

Fourteenth Day of December 1976

[SEAL]

Attest:

RUTH C. MASON
Attesting Officer

C. MARSHALL DANN
Commissioner of Patents and Trademarks